United States Patent [19]
Schober

[11] Patent Number: 5,594,450
[45] Date of Patent: Jan. 14, 1997

[54] RADAR SYSTEM AND METHOD FOR DETECTING TARGETS CLUTTER USING TARGET INTENSITY AND ANGULAR POSITION

[76] Inventor: Michael B. Schober, 11681 N. Europa Pl., Tucson, Ariz. 85737

[21] Appl. No.: 485,743

[22] Filed: Jun. 7, 1995

[51] Int. Cl.[6] .................................................. G01S 13/534
[52] U.S. Cl. ........................ 342/159; 342/160; 342/162; 342/97; 342/62
[58] Field of Search ........................ 342/159, 160, 342/161, 162, 93, 95, 97, 90, 62, 64

[56] References Cited

U.S. PATENT DOCUMENTS 4,675,677   6/1987   von Maydell et al. .................... 342/25

*Primary Examiner*—John B. Sotomayor
*Attorney, Agent, or Firm*—Charles D. Brown; Wanda K. Denson-Low

[57] ABSTRACT

A radar system includes a radar receiver that provides the amplitude and the angular position of a plurality of return signals. A computer forms a test function of amplitudes and angular positions of the plurality of return signals and compares the test function with a threshold value. Returns associated with a test function whose value is equal to or greater than the threshold value are determined to be targets, and those with lesser values are considered clutter.

20 Claims, 5 Drawing Sheets

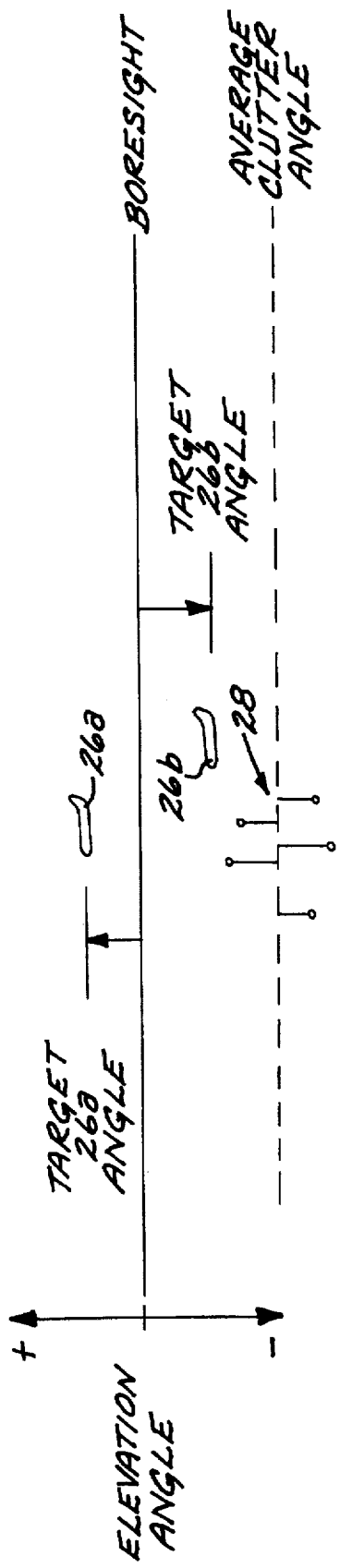
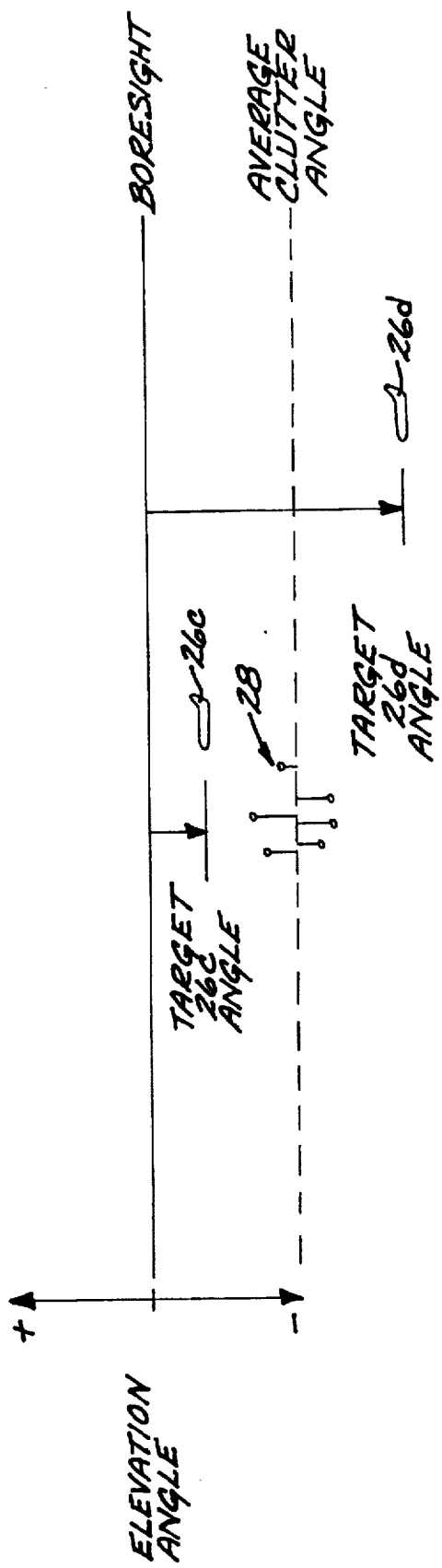
FIG. 2
FIG. 3

RADAR SYSTEM AND METHOD FOR DETECTING TARGETS CLUTTER USING TARGET INTENSITY AND ANGULAR POSITION

BACKGROUND OF THE INVENTION

This invention relates to radar systems, and, more particularly, to a radar system suited for the identification of targets closely associated with background clutter.

In a radar system, a transceiver (transmitter/receiver) transmits a high-frequency signal into space. When the transmitted signal strikes an object, a reflected signal is produced. Some portion of the reflected signal returns to the transceiver and is detected.

If there were a single return signal, the analysis of radar signals would be simple and straightforward. In practice, there are large numbers of return signals detected simultaneously. The returns are generated by a wide variety of features in addition to potential objects of interest, termed targets. If the radar transceiver is aimed on a low trajectory to track low-flying aircraft targets, there are also small-amplitude returns from natural and manmade objects on the ground such as hills and trees, houses, etc. If the radar transceiver is aimed on a higher trajectory, returns can arise from natural objects such as birds and from natural phenomena such as moisture droplets, hail, etc. Those returns present in addition to target returns are generally termed "clutter" herein.

Target returns can sometimes be clearly distinguished from clutter by their appearance during visual inspection of the radar display screen, as when the target return has a much higher amplitude than the clutter returns. In other instances this visual distinction cannot be made readily, or it is desirable to have the capability to distinguish a target from clutter in an automated fashion. In military applications, the radar may be in an unmanned missile which must identify targets without any human assistance. In non-military applications, fully automated aircraft landing systems and flight controller systems to serve as a backup for human control are under development. Such control systems could make use of automated target identification radar systems.

One approach now available for the automated identification of targets among clutter is a radar system utilizing CFAR, or constant false alarm rate detector analysis techniques. In this approach, the amplitude of a return signal is compared to a threshold value which is a multiple of a background amplitude value associated with the clutter. If the return signal is more than this threshold value, the return is judged to be a target rather than clutter. While operable, the conventional CFAR technique does not reliably distinguish targets from clutter in many cases of practical importance, such as the case of a target mixed with ground clutter, wherein the target and the clutter have comparable radar return amplitudes. In another approach, a target is separated from clutter using a range gate or Doppler filtering. If the target is close to or immersed in the clutter, the range gating technique is not useful. If the target is moving at an approximately constant distance from the transceiver, the Doppler-based technique is not successful in identifying the target.

There is a need for an improved radar system that reliably distinguishes targets from clutter. The present invention fulfills this need, and further provides related advantages.

SUMMARY OF THE INVENTION

The present invention provides a radar system and method for distinguishing targets from clutter in a variety of circumstances. Although the approach is widely applicable, it is particularly useful in radar systems that are used to detect targets closely associated with clutter, such as targets where there is an attempt to mask the target using the clutter.

In accordance with the invention, a radar system comprises a radar receiver including means for determining the amplitude and the angular position of a plurality of return signals, and means for identifying targets and clutter among the return signals. The means for identifying includes means for forming a test function of amplitudes and angular positions of the return signals, and means for comparing the test function with a threshold value.

In a related technique, a method for identifying target returns in a radar system comprises the steps of providing the amplitude and angular position values of a plurality of radar return signals including at least one potential target and clutter, forming a test function of amplitudes and angular positions of the return signals, and comparing the test function with a threshold value.

The present approach differs from prior approaches in that it utilizes a radar system including a test function that includes both amplitude and angular position information. In many cases, clutter signals are somewhat clustered, as in the case of ground returns near to an aircraft flying near the horizon. This observation, incorporated into the approach through the angular position information, aids in achieving a better discrimination of the target relative to the clutter.

The test function is preferably found by forming a likelihood ratio test using a joint distribution of amplitude and angular position information. The angular position information is defined relative to a convenient reference such as a boresight of a missile having a forwardly facing radar transceiver. In a preferred case, the test function is of the form $A/B > \gamma$, wherein $$A = EXP\text{-}(\theta-\theta_1/\sigma_1)^2 \times R/(R_o^2+R_T^2) \times EXP\text{-}(R^2/2(R_o^2+R_T^2)), \text{ and}$$

$$B = EXP\text{-}(\theta-\theta_o/\sigma_o)^2 \times R/R_o^2 \times EXP\text{-}(R^2/2(R_o^2)),$$

wherein $\theta 0$ is the angular position of a test return signal, $\theta_1$ is the expected power centroid from the combined target and clutter return, $\sigma_1$ is the standard deviation of $\theta_1$, $\theta_o$ is the average angle of the clutter, $\sigma_o$ is the standard deviation of $\theta_o$, R is the amplitude of the test return signal, $R_o^2$ is the average power of the clutter, and $R_T^2$ is the expected power of the target. Based upon such a function, substantially equivalent relationships can be developed using simplifying assumptions and additional information concerning the particular circumstances and radar system.

The test function is preferably computed by a computer configured to perform the required calculations. Once the test function is calculated, it is compared with a threshold value determined by sampling the return signals and multiplying by a constant. If the test function is larger than the threshold value, it is concluded that the return under test is a target.

The present invention provides a more accurate approach for determining the presence of targets in clutter than previously available. The improvement is particularly valuable when the clutter is clustered about an angular relation in relation to the transceiver, an uncommon situation. The present approach does not depend upon either range gating or Doppler filtering, and is therefore better suited to detect targets that are at about the same distance from the transceiver as the clutter and are not moving toward or away from the transceiver. Other features and advantages of the present invention will be apparent from the following more detailed

3 description of the preferred embodiment, taken in conjunction with the accompanying drawings, which illustrate, by way of example, the principles of the invention.

BRIEF DESCRIPTION OF THE DRAWINGS

FIG. 2 is a schematic diagram of a scene having clustered clutter as viewed on a radar video display, wherein the polarity of the target is known;

FIG. 3 is a schematic diagram of a scene having clustered clutter as viewed on a radar video display, wherein the polarity of the target is unknown;

DETAILED DESCRIPTION OF THE INVENTION

Figure 1:
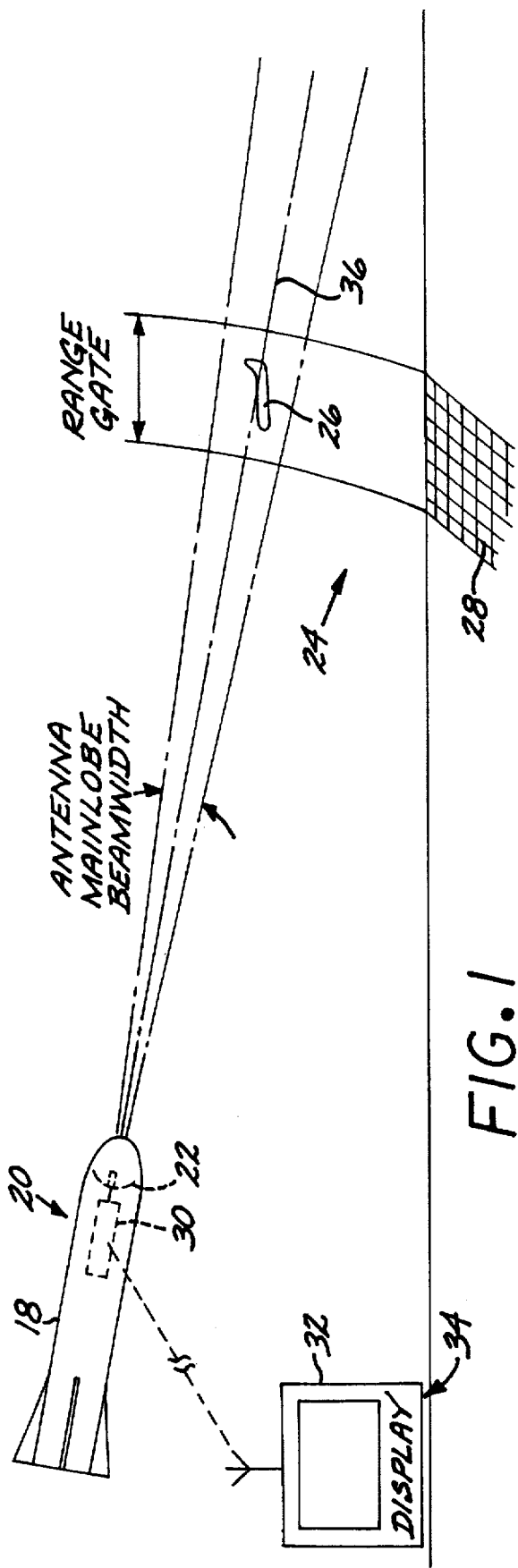
FIG. 1 is a schematic diagram of a radar system in accordance with the invention.

FIG. 1 depicts a missile 18 with a radar system 20 including a radar transceiver 22 which transmits radar signals having an indicated antenna mainlobe beamwidth (corresponding to a field of view), and receives return signals from objects 24. The radar system operates with a range gate that permits selection only of those objects 24 lying within a selected range band, obtained by selecting only those objects which produce return signals lying within a preselected time interval after radar signal transmission. In operation of the radar system 20, the range gate is systematically varied to scan the field of view between small and large ranges. The objects 24 can include a target 26 and clutter 28 lying within the range gate. FIG. 1 illustrates the target 26 well separated from the clutter 28 for clarity, but in many cases the target return is quite close to, or even mixed with, the clutter return, as when the target is flying close to the ground or is a ground target.

The return signals are provided to a computer 30 where they are digitized and, optionally, to a display 32. In many instances, the radar system 20 does not include a display, as the radar system is utilized in an unmanned vehicle. FIG. 1 illustrates the possible use of a display 32 at a remote ground station 34, as a basis for the discussion of succeeding figures. The radar transceiver 22 of FIG. 1 is illustrated as being aimed so that the antenna mainlobe beamwidth is directed along a boresight 36 of the missile, an imaginary line directed forwardly of the missile 18 and which provides a frame of reference for angular measurements. The radar

4 system 20 has the capability to determine the amplitude of a signal return and its angular position relative to some reference, which is conveniently chosen as the boresight.

FIGS. 2 and 3 illustrate two scenes of the type that are viewed on the radar display 32 in particular situations. Targets in these scenes are more readily detected in these scenes using the radar system of the invention than prior radar systems. In FIG. 2, there are two potential targets 26a and 26b and clutter 28, all located at angles relative to the boresight 36, which is selected as the reference zero angle. (FIGS. 2 and 3 illustrate elevational angles, but the same analysis is applicable to azimuthal angles.) From information concerning the nature of the target, it is known that either of the targets 26a or 26b must be located at an angle greater than that of the average angle of the clutter 28, relative to the boresight. This is an example of a target of known "polarity", wherein the target is known to have a particular angular relation to the clutter. In another case, illustrated in FIG. 3, the target may be either above the clutter 28 (target 26c) or below the clutter (target 26d), and therefore its angular position relative to the clutter is not known with certainty. This is an example of a target of unknown polarity.

Figure 4:
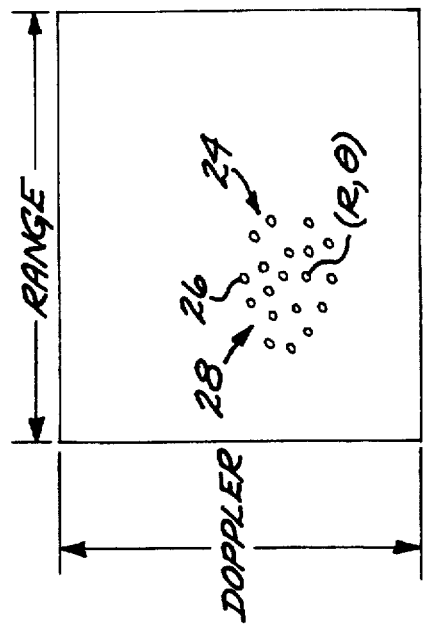
FIG. 4 is a schematic Doppler/range map used in radar signal return analysis.

Each of the radar returns for the targets and the clutter indicated in FIGS. 2 and 3 have associated values of signal return amplitude (i.e., the strength of the signal) and signal return position (i.e., the angular position of the return relative to the boresight). It is customary practice to analyze radar return signals in terms of their Doppler values and their range, as schematically illustrated in FIG. 4. FIG. 4 illustrates radar returns for a potential target 26 and many clutter 28 objects. Although the labelling of FIG. 4 indicates that one of the returns is the target, the identify of the return which is the target is not known prior to the start of the analysis, nor even if a target is present. Each of the returns in FIG. 4 has an associated amplitude R and angular position θ.

In conventional CFAR approaches, only the amplitude of each return signal is analyzed to distinguish a target from clutter. In the present approach, both the amplitude and the angular position of each return signal are analyzed to distinguish a target from clutter. As will be demonstrated, the present approach permits the detection of targets in a more reliable fashion than does the prior approach. This capability becomes more significant as technology advances permit the target signal return to be made so small that it has an amplitude comparable with that of the clutter, or even less than that of the clutter.

Figure 5:
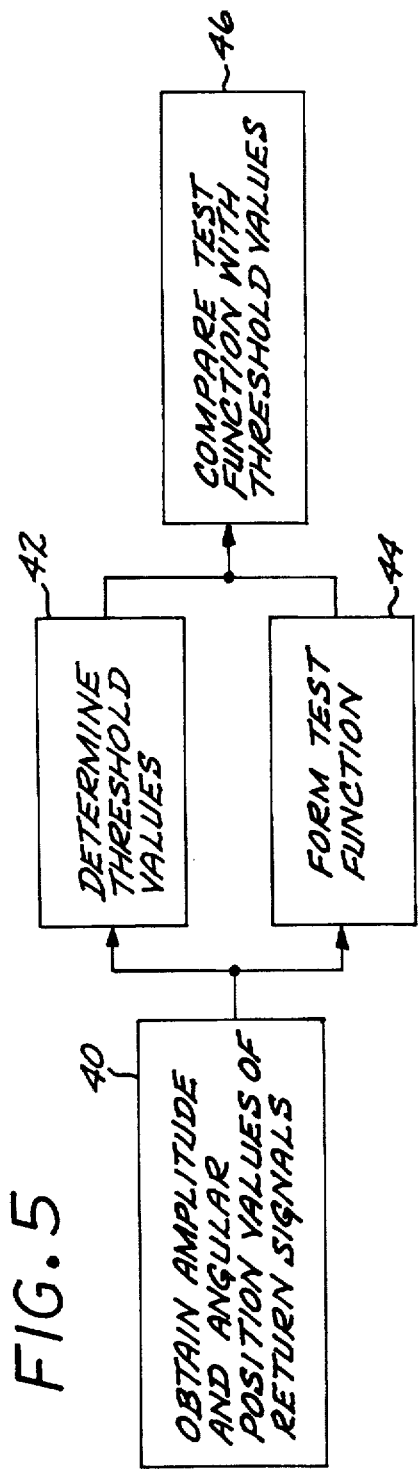
FIG. 5 is a block diagram of a method for determining a target amidst clutter.

FIG. 5 illustrates a method in accordance with the present invention. For each return signal received by the radar transceiver 22, the amplitude and angular position values of the return signal are determined by the computer, numeral 40. The absolute values of this information are not important for the present purposes, only the values relative to some common standard. However, for convenience, the amplitude is determined relative to zero amplitude and the angular position value is determined relative to a reference axis, which is preferably the boresight 36 for the radar system depicted in FIG. 1.

Threshold values are determined for the amplitude and angular position, numeral 42. To determine the threshold values, the radar return signal is digitized, and samples of return signals are picked in an area to be analyzed. The amplitudes of the samples are averaged, and the average amplitude is multiplied by a first constant weighting factor, to obtain the amplitude threshold value. Similarly, the angular positions relative to the reference axis are averaged to obtain an average angular value and multiplied by a second constant weighting factor, to obtain the angular threshold value. Thus, values of $R/R_o$ and $\theta/\theta_o$ are compared to their respective threshold values in one form of the implementation of the present approach. Equivalently, a joint R, θ threshold is determined from these same relations. The two weighting factors are selected to provide an acceptable false alarm rate. They are constants whose values can be varied as desired to increase or decrease the likelihood of a false alarm, that is, indicating a return to be a target when it is in fact clutter.

A test function is also formed for any particular signal return that is to be tested as a potential target, numeral 44. The preferred test function, developed under the assumption that the amplitude distribution is a Rayleigh distribution and that the angular distribution is Gaussian, is of the form A/B, where $$A = EXP - (\theta - \theta_1/\sigma_1)^2 \times R/(R_o^2 + R_T^2) \times EXP - (R^2/2(R_o^2 + R_T^2)), \text{ and}$$

$$B = EXP - (\theta - \theta_o/\sigma_o)^2 \times R/R_o^2 \times EXP - (R^2/2(R_o^2)),$$

wherein θ is the angular position of a test return signal, $\theta_1$ is the expected power centroid from the combined target and clutter return, $\sigma_1$ is the standard deviation of $\theta_1$, $\theta_o$ is the average angle of the clutter, $\sigma_o$ is the standard deviation of $\theta_o$, R is the amplitude of the test return signal, $R_o^2$ is the average power of the clutter, and $R_T^2$ is the expected power of the target. In this expression, A is associated with the case where if a target is present, and B is associated with the case where no target is present. The test function of this form is termed a "combined function" because both amplitude and angular information are utilized together in a single expression. This is to be contrasted with a second, but less preferred embodiment, termed a "separate function", to be discussed subsequently, wherein both amplitude and angular information are used but in separate expressions.

The applicability of the present invention is not limited to the use of this particular test function, and any operable test function applicable to particular situations may be used. In the preferred case, the single test function is a combined or simultaneous function of amplitude and angular information. Less preferably, there can be two test functions, one using amplitude information and the other angular information, which are applied together to analyze the information. The latter case is less preferred because it has been shown to be less precise than the preferred case, but even then it provides an improvement over the prior CFAR amplitude-only approach.

This test function may be simplified for practical applications in situations like that shown in FIG. 1 by assuming (1) that $\sigma_1$ is approximately equal to $\sigma_o$, (2) that $R_T^2/(R_o^2 + R_T^2)$ is approximately equal to unity, and (3) that the target is close to the boresight. The test function then simplifies to the form $$(\theta - \theta_o)^2 - (\theta - \theta_1)^2 + R^2/R_o^2 - 1 \geq \text{Joint } R, \theta \text{ Threshold}.$$

Figure 7:
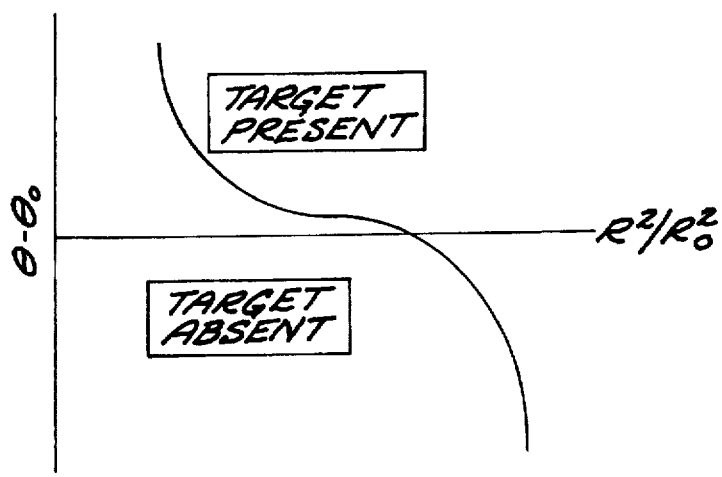
FIG. 7 is a graph of a decision space according to the present approach for a first embodiment of the test function.

The computer 30 digitally evaluates the return signal being tested. However, for interpretative purposes this relation can be represented graphically as shown in FIG. 7. If the values of $(\theta - \theta_o)$ and $(R^2/R_o^2)$ for a return being evaluated as a target are such that the return lies on or above the curve in FIG. 7, the decision is made that the target is detected. If the values of $(\theta - \theta_o)$ and $(R^2/R_o^2)$ are such that the return being evaluated lies below the curve in FIG. 7, the decision is made that no target is detected. Stated alternatively, when the polarity is unknown, $(\theta - \theta_o)^2 + R^2/R_o^2 - 1 \geq \text{Joint } R, \theta$ Threshold, is used to evaluate for the detection of a target in this general case.

The concept of polarity of the expected location of a target relative to clutter was discussed in relation to FIGS. 2-3. This information may be used to speed the testing of the return signals for the presence of a target, and also to compare the present approach with the prior approach. Thus, the above relation may be reduced to the test that if $R/R_o \geq$ amplitude threshold, a detection is declared else $(\theta - \theta_o) * (R^2/R_o^2 - 1) \geq$ Joint R,θ Threshold [where polarity is known], $|\theta - \theta_o| * (R^2/R_o^2 - 1) \geq$ Joint R,θ Threshold [where polarity is unknown].

Figure 6:
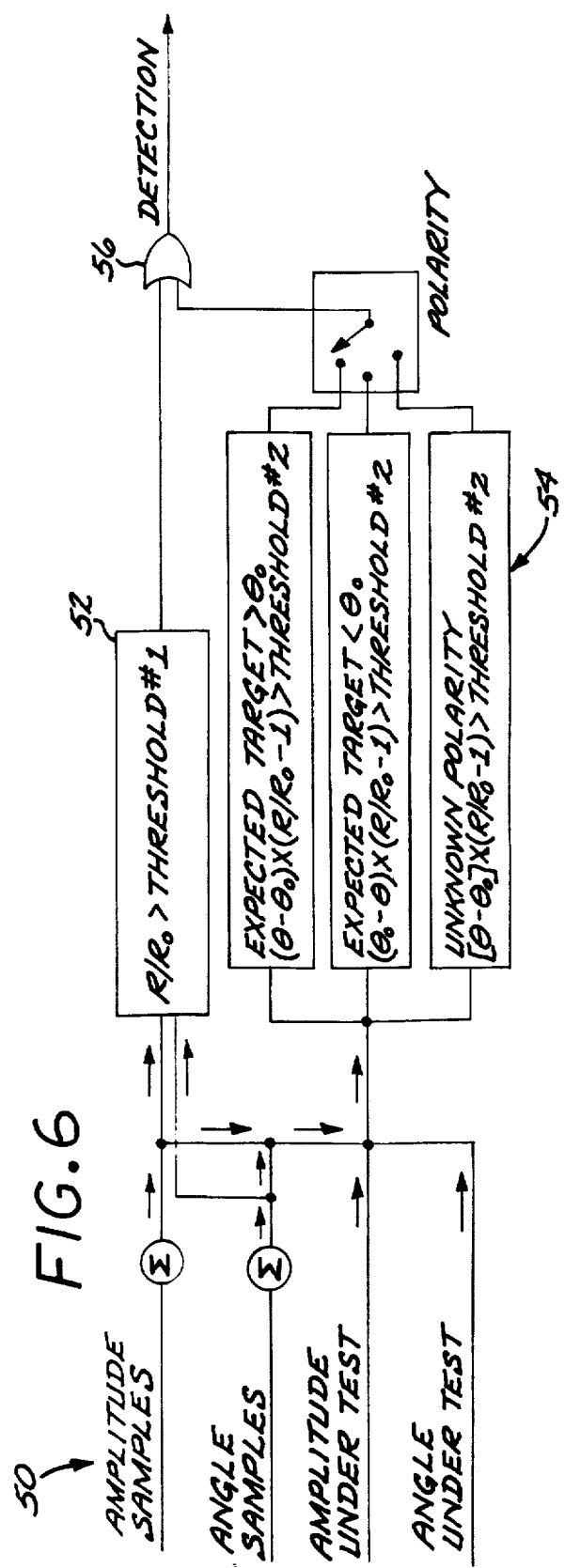
FIG. 6 is a diagram depicting data flow for a preferred embodiment of the present approach.
Figure 8:
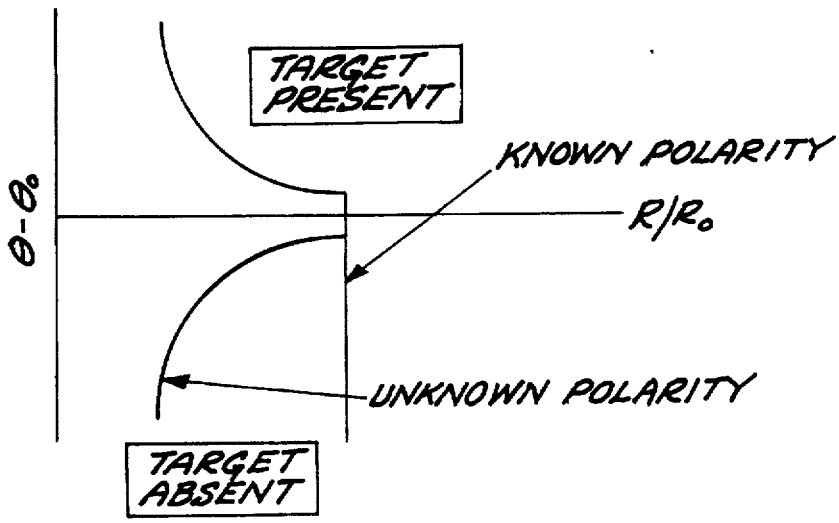
FIG. 8 is a graph of a decision space according to the present invention, after simplifying assumptions have been made.

This simplified approach is depicted graphically in FIG. 8 and operationally in FIG. 6. The amplitude and angular position samples of the radar returns are taken, numeral 50. The values are tested under the assumption that one of the returns is a target and the rest of the returns are clutter. Based upon this assumption, the values of R and θ are determined for the target, and the values of $R_o$ and $\theta_o$ are determined for the clutter. When $R/R_o$ is equal to or greater than the amplitude threshold, a target is declared and it is not necessary to utilize the angular position information, numeral 52. On the other hand, if $R/R_o$ is less than the amplitude threshold, the present approach allows a target to be detected using the angular position information in some cases where the prior approach, using only amplitude information, would not detect a target. The angular orientation-dependent calculations are made according to the above discussion and the polarity information, if available, numeral 54. A target is declared, numeral 56, if either the amplitude-only test is satisfied, numeral 52, or the amplitude/angular orientation test is satisfied, numeral 54.

Figure 9:
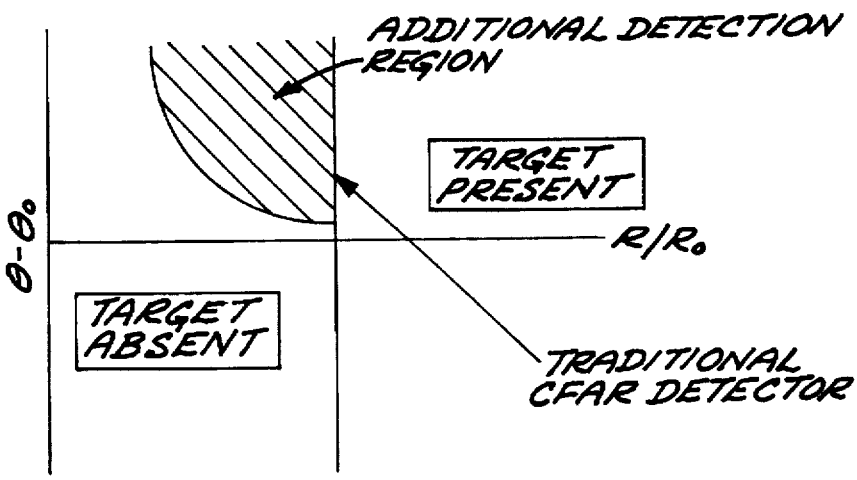
FIG. 9 is a graph of a decision space similar to that of FIG. 7, indicating the region where a target would be detected when the present approach is used, but would not be detected when a prior approach is used.

The approach of the present invention results in improved target detection as compared with a conventional test wherein only the signal return amplitude information is used. FIG. 9 depicts the region of improved target detection in the graphical form of FIGS. 7-8. Targets whose amplitude ratio is below that which can be detected by the conventional test, but which are angularly sufficiently separated in $\theta - \theta_o$ from the radar reference axis (such as the boresight), can be detected by the present approach but not by the prior, amplitude-only, approach.

Figure 10:
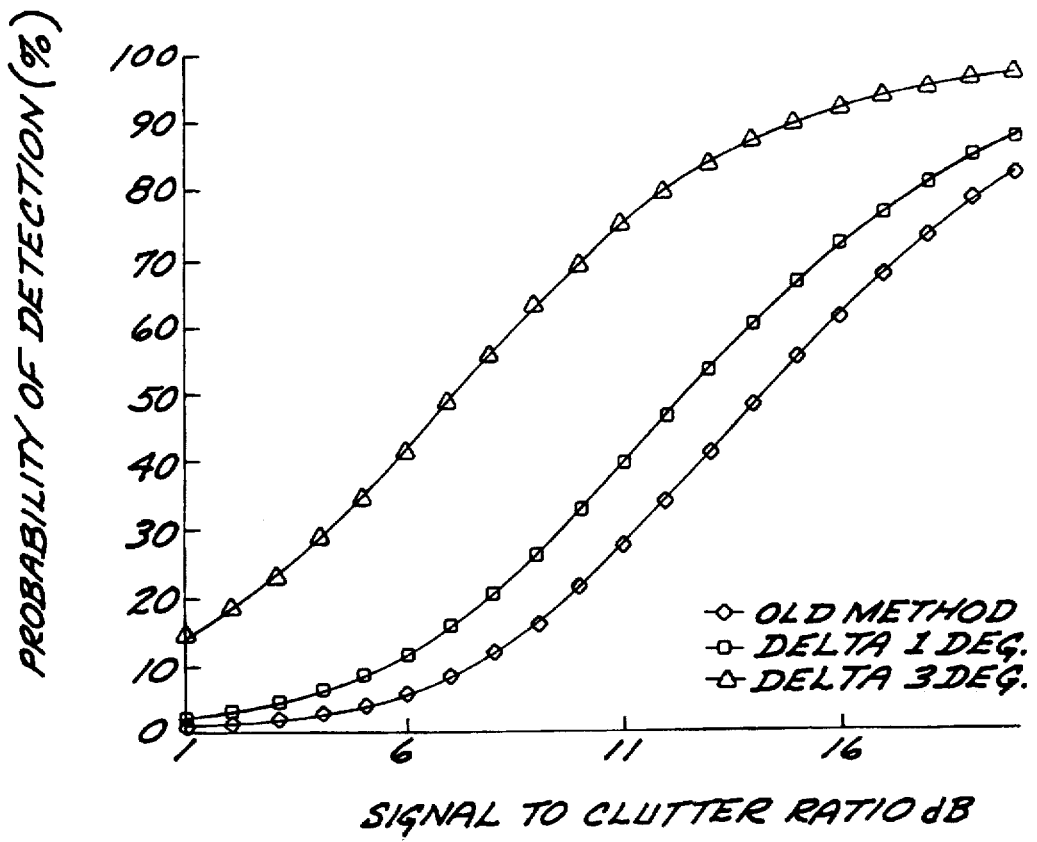
FIG. 10 is a graph of test results utilizing the present approach as compared with a prior approach.

This conclusion was confirmed by a computer simulation in which simulated Rayleigh amplitudes and Gaussian angles were used to generate 100,000 monte carlo trials at different signal-to-clutter ratios. With the probability of false alarm maintained constant at about $10^{-3}$, results were obtained for the conventional amplitude-only approach and the present approach using the known-polarity case. The present approach was evaluated for two angular separations of the target from the clutter, 1° and 3°, both of which are quite small separations. The results of the simulations are shown in FIG. 10. As the target-to-clutter amplitude ratio increases (horizontal axis), both of the approaches become increasingly capable of detecting the target (vertical axis). The present approach yields improved results for all cases, but the results are most significantly improved for low target-to-clutter amplitude ratios and moderate angular position separations of the target from the clutter. For example, for a target-to-clutter ratio of 6 dB and a target-to-clutter angular position separation of 3°, the probability of detection using the present approach is about 8–10 times greater than that obtained using the conventional, amplitude-only, approach. The result is that the present approach permits the target which is slightly angularly separated from the clutter to be identified earlier and with greater certainty than previously possible.

Figure 11:
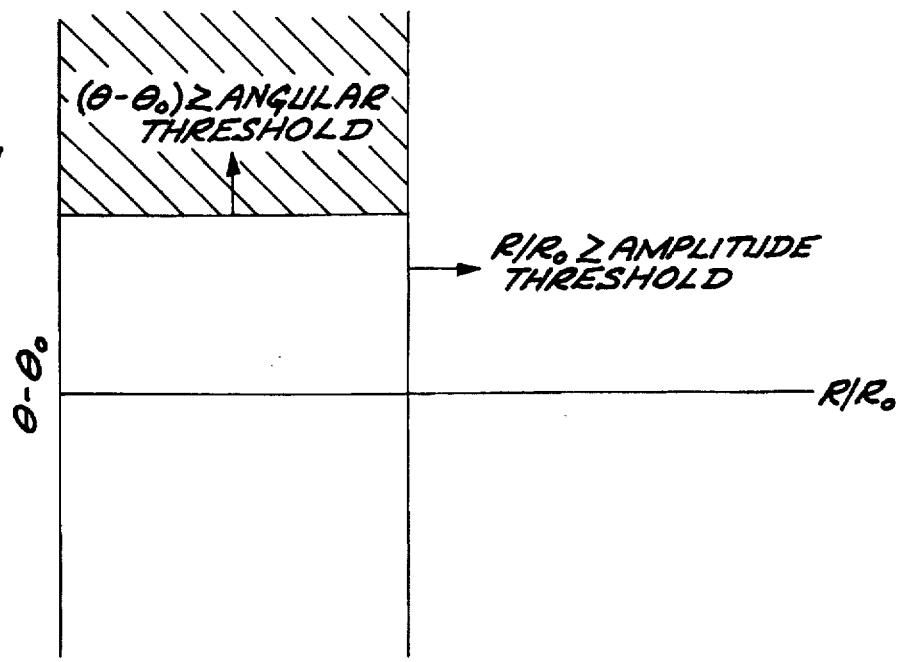
FIG. 11 is a graph of a decision space for a second embodiment of the test function.

In another embodiment, both the amplitude and angular information are used, but in a separate function rather than a combined function. In a preferred approach of this type, $R/R_o$ and $(\theta-\theta_o)$ taken together constitute the test functions, each of which involves only one of the quantities amplitude and angular position. Either of the two test functions may be satisfied for a target to be declared, according to the relations $R/Ro \geq$ Amplitude Threshold, or $\theta-\theta_o \geq$ Angular Threshold FIG. 11 illustrates the application of this technique. The shaded area again represents the area of target detection that would not be achieved by traditional CFAR approaches. While operable, this approach is less preferred because the use of separate functional relations of amplitude and angular positions yields less precise target discrimination than does the use of a combined functional relation of amplitude and angular position.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A radar system, comprising:

a radar receiver including means for determining the amplitude and the angular position of a plurality of return signals; and means for identifying targets and clutter among the return signals, the means for identifying including
means for forming a test function of amplitudes and angular positions of the return signals, and
means for comparing the test function with a threshold value.

2. The radar system of claim 1, wherein the means for identifying comprises a computer configured to form the test function and to compare the test function with the threshold value.

3. The radar system of claim 1, wherein the means for forming a test function includes means for determining an average amplitude value for the plurality of return signals, and means for determining an average angular position value for the plurality of return signals.

4. The radar system of claim 3, wherein the means for forming a test function further includes means for forming the test function for a test return signal as a function of the amplitude and angular position of the test return signal and the average amplitude value and the average angular position value.

5. The radar system of claim 1, wherein the means for forming a test function includes means for determining an angular position relative to a preselected reference value.

6. The radar system of claim 5, where the preselected reference value is the boresight of a missile.

7. The radar system of claim 1, wherein the means for forming a test function includes means for forming a function substantially equivalent to the function A/B, wherein $A=EXP-(\theta-\theta_1/\sigma_1)^2 \times R/(R_o^2+R_T^2) \times EXP-(R^2/2(R_o^2+R_T^2))$, and $B=EXP-(\theta-\theta_o/\sigma_o)^2 \times R/R_o^2 \times EXP-(R^2/2(R_o^2))$, wherein $\theta$ is the angular position of a test return signal, $\theta_1$ is the expected power centroid from the combined target and clutter return, $\sigma_1$ is the standard deviation of $\theta_1$, $\theta_o$ is the average angle of the clutter, $\sigma_o$ is the standard deviation of $\theta_o$, $R$ is the amplitude of the test return signal, $R_o^2$ is the average power of the clutter, and $R_T^2$ is the expected power of the target.

8. The radar system of claim 1, wherein the means for identifying targets and clutter includes means for sampling the return signal to provide a plurality of sample power values, and means for forming the threshold value from the plurality of sample power values.

9. The radar system of claim 1, wherein the means for identifying targets and clutter includes means for sampling the return signal to provide a plurality of angular position values, and means for forming the threshold value from the plurality of angular position values.

10. The radar system of claim 1, wherein the means for identifying targets and clutter includes means for concluding that a return signal is a target if its test function is greater than the threshold value.

11. The radar system of claim 1, wherein the radar system further comprises a radar transmitter.

12. The radar system of claim 1, wherein the test function is a combined test function of amplitudes and angular positions.

13. The radar system of claim 1, wherein the test function is a separate test function of amplitudes and angular positions.

14. A radar system, comprising:

a radar receiver that provides the amplitude and the angular position of a plurality of return signals; and a computer configured to form a test function of amplitudes and angular positions of the plurality of return signals and to compare the test function with a threshold value.

15. A method for identifying target returns in a radar system, comprising the steps of obtaining the amplitude and angular position values of a plurality of radar return signals including at least one potential target and clutter;

determining a threshold value;

forming a test function of amplitudes and angular positions of the return signals; and comparing the test function with the threshold value.

16. The method of claim 15, wherein the step of forming a test function includes the steps of determining an average amplitude value for the plurality of return signals, and determining an average angular position value for the plurality of return signals.

17. The method of claim 16, wherein the step of forming a test function includes the step of forming the test function for a test return signal as a function of the amplitude and angular position of the test return signal and the average amplitude value and the average angular position value.

18. The method of claim 15, wherein the step of forming a test function includes the step of forming a function substantially equivalent to the function A/B, wherein $$A = EXP-(\theta-\theta_1/\sigma_1)^2 \times R/(R_o^2+R_T^2) \times EXP-(R^2/2(R_o^2+R_T^2)), \text{ and}$$

$$B = EXP-(\theta-\theta_o/\sigma_o)^2 \times R/R_o^2 \times EXP-(R^2/2(R_o^2)),$$

wherein $\theta$ is the angular position of a test return signal, $\theta_1$ is the expected power centroid from the combined target and clutter return, $\sigma_1$ is the standard deviation of $\theta_1$, $\theta_o$ is the average angle of the clutter, $\sigma_o$ is the standard deviation of $\theta_o$, R is the amplitude of the test return signal, $R_o^2$ is the average power of the clutter, and $R_T^2$ is the expected power of the target.

19. The method of claim 15, wherein the step of determining a threshold value includes the steps of sampling the return signal to provide a plurality of sample power values, and forming the threshold value from the plurality of sample power values.

20. The method of claim 15, wherein the step of determining a threshold value includes the steps of sampling the return signal to provide a plurality of angular position values, and forming the threshold value from the plurality of angular position values.

* * * * *